(12) United States Patent
Wagner et al.

(10) Patent No.: US 12,311,547 B2
(45) Date of Patent: May 27, 2025

(54) METHOD FOR LABELLING A TRAINING SET INVOLVING A GUI

(71) Applicant: ROBOVISION, Zwijnaarde (BE)

(72) Inventors: Andrew Wagner, Zwijnaarde (BE);
Ruben Van Parys, Zwijnaarde (BE);
Matthias Verstraete, Technologiepark (BE); Tim Waegeman, Zwijnaarde (BE)

(73) Assignee: ROBOVISION, Zwijnaarde (BE)

( * ) Notice: Subject to any disclaimer, the term of this patent is extended or adjusted under 35 U.S.C. 154(b) by 549 days.

(21) Appl. No.: 17/780,838

(22) PCT Filed: Nov. 30, 2020

(86) PCT No.: PCT/EP2020/083940
§ 371 (c)(1),
(2) Date: May 27, 2022

(87) PCT Pub. No.: WO2021/105505
PCT Pub. Date: Jun. 3, 2021

(65) Prior Publication Data
US 2023/0009292 A1    Jan. 12, 2023

(30) Foreign Application Priority Data
Nov. 28, 2019  (EP) ................................. 19212254

(51) Int. Cl.
*B25J 9/16* (2006.01)
*G06T 7/11* (2017.01)
(Continued)

(52) U.S. Cl.
CPC ............... *B25J 9/163* (2013.01); *B25J 9/161* (2013.01); *B25J 9/1653* (2013.01); *B25J 9/1666* (2013.01);
(Continued)

(58) Field of Classification Search
CPC .. B25J 9/163; B25J 9/161; B25J 9/1653; B25J 9/1666; B25J 9/1697; G06T 7/11;
(Continued)

(56) References Cited

U.S. PATENT DOCUMENTS 8,477,154 B2 * 7/2013 Davis ....................... G09G 5/00
345/650
10,444,759 B2 * 10/2019 Douillard ............. G05D 1/0212
(Continued)

FOREIGN PATENT DOCUMENTS

WO    WO-2022194883 A2 *  9/2022  ............ B25J 9/1669

OTHER PUBLICATIONS

De Gregorio et al., *Semi-Automatic Labeling for Deep Learning in Robotics*, ARXIV.org, Cornell Univ Library (Aug. 5, 2019).
(Continued)

*Primary Examiner* — Mia M Thomas
(74) *Attorney, Agent, or Firm* — Knobbe, Martens, Olson & Bear, LLP

(57) ABSTRACT

The present invention relates to a computer-implemented method for labelling a training set, preferably for training a neural network, with respect to a 3D physical object by means of a GUI, the method comprising the steps of: obtaining a training set relating to a plurality of training objects, each of the training objects comprising a 3D surface similar to the 3D surface of said object, the training set comprising at least two images for each training object; generating, for each training object, a respective 3D voxel representation based on the respective at least two images; receiving, via said GUI, manual annotations with respect to a plurality of segment classes from a user of said GUI for labelling each of the training objects; and preferably training, based on said manual annotations (91, 92, 93), at least one NN, for obtaining said at least one trained NN.

15 Claims, 10 Drawing Sheets

(51) Int. Cl.
*G06V 10/774* (2022.01)
*G06V 10/82* (2022.01)

(52) U.S. Cl.
CPC .............. *B25J 9/1697* (2013.01); *G06T 7/11* (2017.01); *G06V 10/7747* (2022.01); *G06V 10/82* (2022.01); *G06T 2207/10028* (2013.01); *G06T 2207/20104* (2013.01)

(58) Field of Classification Search
CPC . G06T 2207/10028; G06T 2207/20104; G06T 2207/20081; G06T 7/55; G06T 2207/20084; G06V 10/7747; G06V 10/82
See application file for complete search history.

(56) References Cited

U.S. PATENT DOCUMENTS

| | | | | |
|---|---|---|---|---|
| 11,425,866 | B2* | 8/2022 | Burden | B25J 9/1697 |
| 11,455,774 | B2* | 9/2022 | Claessen | G06N 3/08 |
| 11,494,957 | B2* | 11/2022 | Claessen | G06T 11/008 |
| 2019/0108639 | A1* | 4/2019 | Tchapmi | G06N 3/044 |
| 2019/0380278 | A1* | 12/2019 | Burden | B25J 9/003 |
| 2020/0008355 | A1* | 1/2020 | Nir | A01D 46/30 |
| 2020/0184718 | A1* | 6/2020 | Chiu | G06T 7/20 |
| 2020/0286282 | A1* | 9/2020 | Grant | G06V 20/647 |
| 2020/0320685 | A1* | 10/2020 | Anssari Moin | G06V 10/454 |
| 2021/0000013 | A1* | 1/2021 | Robertson | B25J 15/0019 |
| 2021/0082184 | A1* | 3/2021 | Claessen | A61B 6/51 |
| 2022/0222816 | A1* | 7/2022 | Carnell | G06T 7/0012 |
| 2022/0297291 | A1* | 9/2022 | Van Parys | B25J 9/1653 |
| 2023/0334682 | A1* | 10/2023 | Fang | G06V 10/82 |
| 2024/0144525 | A1* | 5/2024 | Vergeynst | G06T 7/11 |
| 2024/0161325 | A1* | 5/2024 | Verstraete | G06V 20/188 |
| 2024/0165807 | A1* | 5/2024 | Wagner | B25J 9/1669 |
| 2024/0398584 | A1* | 12/2024 | Badura | G06T 7/62 |

OTHER PUBLICATIONS

Osteen et al., *Reducing the cost of visual DL datasets*, Proceedings of SPIE, vol. 11006 (May 10, 2019).

* cited by examiner

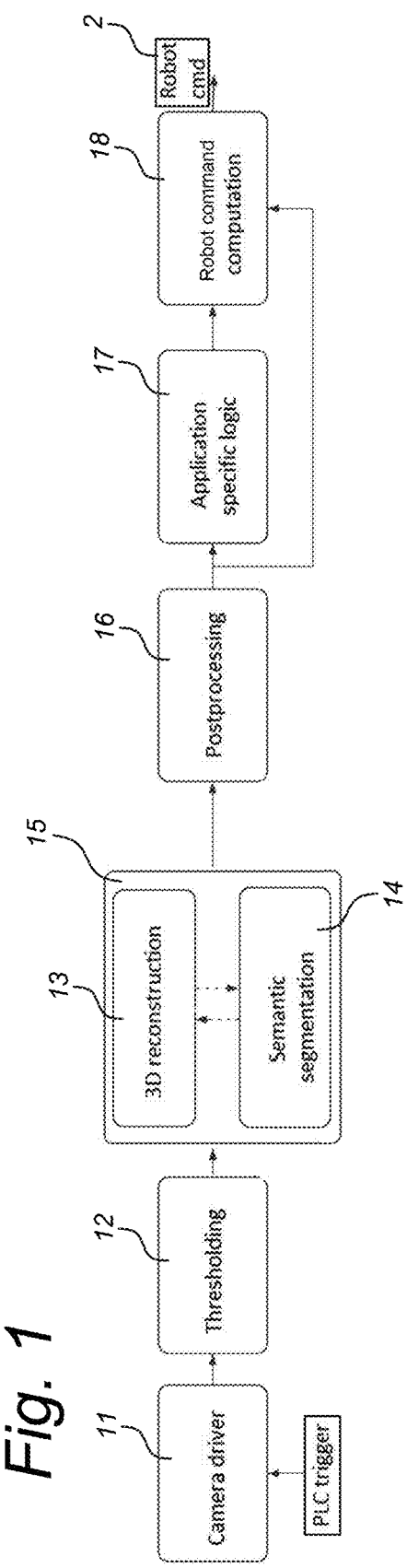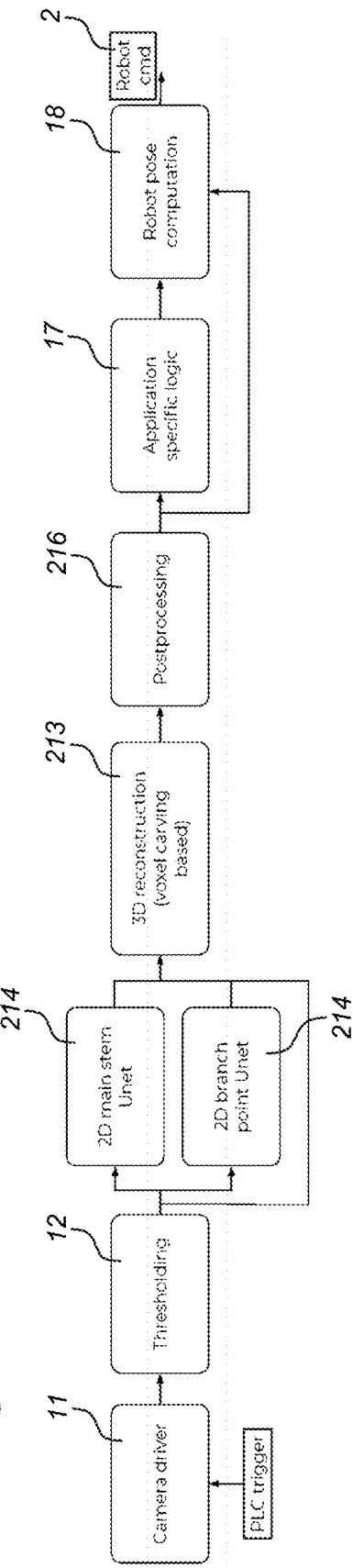

METHOD FOR LABELLING A TRAINING SET INVOLVING A GUI

CROSS REFERENCE TO RELATED APPLICATIONS

This application is the U.S. National Phase Application under 35 U.S.C. § 371 of International Application No. PCT/EP2020/083940, filed Nov. 30, 2020, which claims priority to European Application No. 19212254.7, filed on Nov. 28, 2019, the entire disclosure of each of which is hereby incorporated by reference.

FIELD OF THE INVENTION

The present invention relates to methods for labelling a training set for training a neural network, wherein the labelling involves a GUI.

BACKGROUND ART

In image analysis of 3D objects in the context of robot automation, visualization and 3D image reconstruction is fundamental for enabling accurate handling of physical objects. Image data may be a mere set of 2D images, requiring extensive processing in order to generate appropriate robot commands that take into account the features of the object as well as the requirements of the application.

In particular, a problem with known methods may be to take into account the structure of the object, including the 3D surface, for which the handling may depend critically on the handling coordinate and the orientation of the 3D object.

US20190087976A1 discloses an information processing device includes a camera and a processing circuit. The camera takes first distance images of an object for a plurality of angles. The processing circuit generates a three-dimensional model of the object based on the first distance image, and generates an extracted image indicating a specific region of the object corresponding to the plurality of angles based on the three-dimensional model. Thereby, US20190087976A1 discloses examples of estimated gripping locations for coffee cups by deep learning, wherein the deep learning may relate to neural networks such as convolutional neural networks. However, US20190087976A1 does not disclose details of training and using the convolutional neural networks.

EP3480730A1 discloses computer-implemented method for identifying features in 3D image volumes includes dividing a 3D volume into a plurality of 2D slices and applying a pre-trained 2D multi-channel global convolutional network (MC-GCN) to the plurality of 2D slices until convergence. However, EP3480730A1 does not disclose handling of 3D objects.

WO2019002631A1 discloses 3D modelling of 3D dentomaxillofacial structures using deep learning neural networks, and, in particular, though not exclusively, to systems and methods for classification and 3D modelling of 3D dentomaxillofacial structures using deep learning neural networks and a method of training such deep learning neural networks. However, also WO2019002631A1 does not disclose handling of 3D objects.

US20180218497A1 discloses CNN likewise but does not disclose handling of 3D objects.

The document (Weinan Shi, Rick van de Zedde, Huanyu Jiang, Gert Kootstra, Plant-part segmentation using deep learning and multi-view vision, Biosystems Engineering 187:81-95, 2019) discloses 2D images and 3D point clouds and semantic segmentation but does not discloses handling of 3D objects.

(DANIELE DE GREGORIO ET AL: "Semi-Automatic Labelling for Deep Learning in Robotics", ARXIV.org, CORNELL UNIVERSITY LIBRARY, 201 OLIN LIBRARY CORNELL UNIVERSITY ITHACA, NY 14853, 5 Aug. 2019) discloses a method relating to 2D and 3D views relating to an object, but is complex to use.

The present invention aims at addressing the issues listed above.

SUMMARY OF THE INVENTION

According to a first aspect, the invention provides a computer-implemented method for labelling a training set, preferably for training a NN, with respect to a 3D physical object by means of a GUI, according to claim 1. Thereby, at least one, preferably each of said at least two images, may relate to 2D images. Furthermore, the 3D voxel representation may relate at least to the 3D surface of the respective training object.

The advantage of such computer-implemented method is the increased efficiency and user-friendliness for an operator providing said manual annotations. In contrast with, e.g., (DANIELE DE GREGORIO ET AL: "Semi-Automatic Labelling for Deep Learning in Robotics", ARXIV.org, CORNELL UNIVERSITY LIBRARY, 201 OLIN LIBRARY CORNELL UNIVERSITY ITHACA, NY 14853, 5 Aug. 2019), a 3D reconstruction view comprising a 3D voxel representation is provided. Applicant has found that the use of such a 3D reconstruction view according to the invention allows for significant improvement in ease of labelling and speed of labelling, without compromising the quality of the labelled data.

In another aspect, the invention provides a labelled training set or a trained NN obtained by the computer-implemented method according to the invention.

Preferred embodiments and their advantages are provided in the description and the dependent claims.

BRIEF DESCRIPTION OF THE DRAWINGS

The present invention will be discussed in more detail below, with reference to the attached drawings.

FIG. 1 illustrates example embodiments of a method according to the invention.

FIG. 2 provides an overview of example embodiments of a method according to the invention.

DESCRIPTION OF EMBODIMENTS

Figure 3:
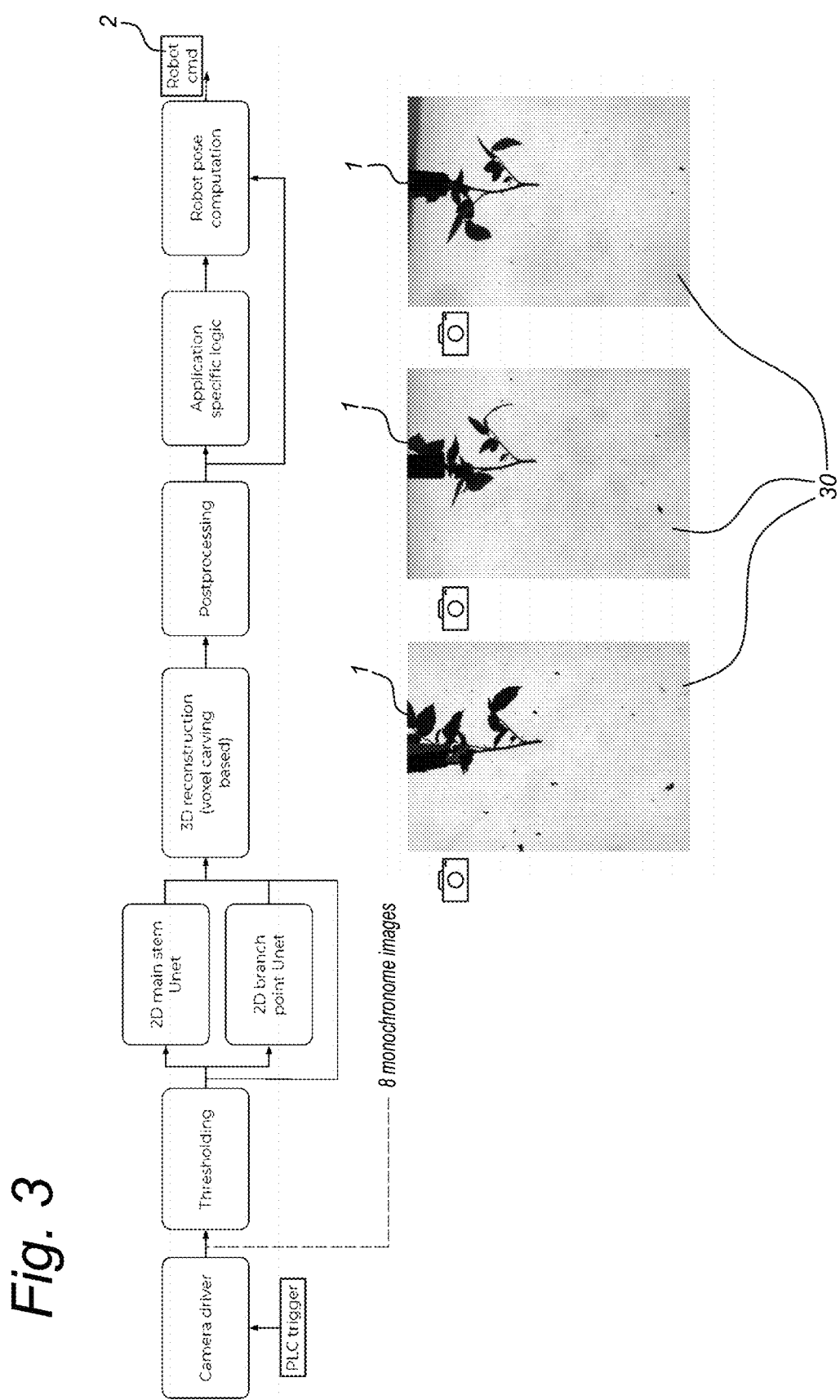
FIG. 3 illustrates an image acquisition step of example embodiments of a method according to the invention.

The present invention will be described with respect to particular embodiments and with reference to certain drawings but the invention is not limited thereto but only by the claims.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The term "reference volume" is to be interpreted as a generic descriptor of the space surrounding the 3D object, wherein a reference volume can be defined according to a three-dimensional reference system, such as Cartesian coordinates in three dimensions. This term does not imply any constraint with respect to these dimensions.

The term "U-net" may relate to the CNN as described in, e.g., (Ronneberger, Olaf; Fischer, Philipp; Brox, Thomas (2015). "U-net: Convolutional Networks for Biomedical Image Segmentation. arXiv:1505.04597") and (Long, J.; Shelhamer, E.; Darrell, T. (2014). "Fully convolutional networks for semantic segmentation". arXiv:1411.4038).

Neural networks need to be trained to learn the features that optimally represent the data. Such deep learning algorithms includes a multilayer, deep neural network that transforms input data (e.g. images) to outputs while learning higher level features. Successful neural network models for image analysis are semantic segmentation NNs. One example is the so-called convolutional neural network (CNN). CNNs contain many layers that transform their input using kernels, also known as convolution filters, consisting of a relatively small sized matrix. Other successful neural network models for image analysis are instance segmentation NNs. As known to the skilled person, instance segmentation NNs differ from semantic segmentation NNs in terms of algorithm and output, even in cases where the input, e.g. the images, are identical or very similar.

In general, semantic segmentation may relate, without being limited thereto, to detecting, for every pixel (in 2D) or voxel (in 3D), to which class of the object the pixel belong. In examples, all stems of a multi-stemmed rose or all leaves of a rose may be segmented according to a single segment class.

Instance segmentation, on the other hand, may relate, without being limited thereto, to detecting, for every pixel, a belonging instance of the object. It may detect each distinct object of interest in an image. In examples, multiple roses in a single image or 3D point cloud may be identified as individual objects. In examples, multiple instances of a portion of a 3D object, such as individual stems of a multi-stemmed rose or individual leaves of a rose, may be identified as individual object portions.

In embodiments, 2D instance segmentation, preferably operating on 2D images, relates to Mask R-CNN, Deep-Mask, and/or TensorMask.

In embodiments, 3D instance segmentation, preferably operating on a 3D point cloud generated from 2D images, relates to 3D-BoNet and/or ASIS.

The term neural network, NN, refers to any neural network model. The NN may comprise any or any combination of a multilayer perceptron, MLP, a convolutional neural network, CNN, and a recurrent neural network, RNN. A trained NN relates to training data associated with a neural network based model.

In embodiments, said robot command (2) is based at least on said 3D coordinate, and said robot command (2) relates to a handling coordinate on said object (1) relating to said 3D coordinate.

In embodiments, said robot command (2) is further based on said 3D orientation of said object (1), wherein said robot command (2) further comprises a 3D approaching angle for reaching the handling coordinate on said object (1).

In embodiments, the generating (14) comprises said 2D segmenting (14) of said at least two images (30) by means of said at least one trained CNN followed by said performing (13) of said 3D reconstruction of said 3D surface of said object (1) based on said at least two segmented images; wherein said 2D segmenting comprises identifying pixels corresponding to said 3D surface of said object (1) and segmenting the pixels corresponding to said surface of said object (1) with said trained NN for obtaining at least two segmented images; wherein said performing (13) of said 3D reconstruction of said 3D surface comprises obtaining a voxel representation and letting segmented pixels of the at least two segmented images correspond to segmented voxels in said voxel representation for obtaining said segmented voxel representation.

In embodiments, said 3D reconstruction of said 3D surface is based on both said at least two images and said one or more segmented images. This leads to improved accuracy of the 3D reconstruction.

In embodiments, the 3D voxel representation may relate to a rotatable 3D voxel representation, said rotatable 3D voxel representation, preferably being a 3D voxel representation of the 3D surface of the respective training object, being configured to rotate along at least one dimension, preferably at least two dimensions, more preferably each of the three dimensions. Preferably, said rotation is based on a rotation user instruction of the user. This may further facilitate manual annotation.

In embodiments, at least one of said plurality of cameras 3 is a hyperspectral camera, wherein said computing of said robot command is further based on values of pixels whereof at least the intensity is determined based on hyperspectral image information. This may lead to enhanced performance and/or robustness for applications wherein part of the 3D surface information of the object may be obtained outside of the visual spectrum. This is particularly advantageous in cases wherein the object comprises a portion of a plant, enabling plant health evaluation and plant disease detection, wherein use of hyperspectral cameras allows earlier detection of plant diseases compared to the standard RGB imaging. This relates to the fact that healthy and affected plant tissue show different spectral signatures, due to different water content, wall cell damage and chlorophyll concentration of plants. In preferred embodiments, the spectral band processed by the one or more hyperspectral cameras does not comprise the entire visible spectral band, as this may optimize processing time. In embodiments, the processed spectral band is obtained by shifting the visible spectral band. In embodiments, a frequency shift or, equivalently, a wavelength shift is performed such that the processed spectral band overlaps at least partially with the near infrared band between 700 nm and 2500 nm, and/or the near infrared band between 428 THz and 120 THz. This corresponds to infrared bands with particular relevance for plant health. In embodiments, this relates to a wavelength shift of at least 10%, more preferably at least 50% and/or preferably by applying a wavelength offset of at least 100 nm, more preferably at least 500 nm.

In embodiments, the generating (14) comprises said performing (13) of said 3D reconstruction of said 3D surface of said object (1) based on said at least two images (30) for obtaining said voxel representation followed by said 3D segmenting (14) of said voxel representation by means of said at least one trained 3D NN, wherein said 3D segmenting (14) comprises identifying voxels belonging to said 3D surface of said object (1) and segmenting the voxels belonging to said 3D surface with the trained 3D NN for obtaining said segmented voxel representation.

In embodiments, said method comprises the further step of post-processing (16) said segmented voxel representation in view of one or more semantic segmentation rules relating to one or more segment classes with respect to said 3D surface.

In embodiments, said post-processing (16) comprises processing said segmented voxel representation according to a Rotation Equivariant Vector Field Network (RotEqNet) NN. This relates to applying one or more trained RotEqNet NN to the segmented voxel representation. This is particularly useful when the object comprises a main direction, as the RotEqNet NN enables to process the segmented voxel representation such that the main direction is taken into account, leading to a more reliable computation of the robot command. Examples of objects with a main direction are objects comprising a symmetry with respect to a symmetry axis being the main direction; particular examples are flower bulbs. Other examples may be objects having a direction with respect to which the diameter of the object is minimized or maximized, e.g. the length direction of an elongate object.

In embodiments, said semantic segmentation NN comprises any or any combination of: 2D U-net, 3D U-net, Dynamic Graph CNN (DGCNN), PointNet++. In preferred embodiments, semantic segmentation in two dimensions is done with a convolutional neural network, CNN. In alternative embodiments, instead of a 2D CNN, also a 2D NN that is not convolutional may be considered. In preferred embodiments, segmentation in three dimensions is done with a neural network that may either be convolutional, such as a DGCNN, or non-convolutional, such as PointNet++. In embodiments, another variant of PointNet++ relating to PointNet may be considered without altering the scope of the invention. In preferred embodiments, semantic segmentation with a 2D CNN relates to U-net. In preferred embodiments, semantic segmentation with a 3D NN relates to DGCNN or PointNet++. Herein, DGCNN may relate to methods and systems described in (Yue Wang et al., Dynamic Graph CNN for Learning on Point Clouds, CoRR, 2018, http://arxiv.org/abs/1801.07829), and PointNet++ may relate to methods and systems described in (Charles R. Qi et al., PointNet++: Deep Hierarchical Feature Learning on Point Sets in a Metric Space, 2017, https://arxiv.org/abs/1706.02413).

In embodiments, said actuation relates to cutting said object.

In embodiments, the 3D surface comprises one or more protrusions, and said 3D approaching angle relates to approaching said 3D surface in view of a position of said one or more protrusions. This may provide the advantage that collision with said protrusions is avoided when the robot element approaches the object. Examples of such protrusions may be one or more leaves, wherein the object comprises a portion of a plant comprising one or more leaves, and collision with the leaves is avoided.

In embodiments, said 3D surface of said object (2) comprising one or more protrusions, wherein said actuation relates to cutting said object at the handling coordinate, and wherein said 3D approaching angle for reaching the handling coordinate on said object relates to a 3D cutting angle for reaching the handling coordinate in view of a position of said one or more protrusions.

In embodiments, said 3D surface of said object (2) is a plant comprising a stem corresponding to a first segment class and one or more leaves corresponding to a second segment class, wherein said actuation relates to cutting said stem at said handling coordinate, and wherein said 3D approaching angle for reaching the handling coordinate on said object relates to a 3D cutting angle for reaching the handling coordinate in view of a position of said leaves.

In embodiments, the method of the present invention comprising the further step of actuating said robot element (4) based on said robot command (2).

In embodiments, the method of the present invention comprising the further steps of
   obtaining a training set relating to a plurality of training objects (9), each of the training objects comprising a 3D surface similar to the 3D surface of said object (1), the training set comprising at least two images for each training object;
   receiving manual annotations (91, 92, 93) with respect to a plurality of segment classes (91a, 92a, 93a) from a user for each of the training objects via a GUI (90, 110);
   training, based on said manual annotations (91, 92, 93), at least one NN, for obtaining said at least one trained NN.

In embodiments, the plurality of cameras located at a plurality of camera positions is replaced by a single camera shooting images from each of the plurality of camera positions. Such embodiments may involve a switch-over time for the camera to move from one camera position to the next camera position, which may increase the latency in acquiring. This may have the advantage of cost reduction, using a single camera instead of several cameras.

In embodiments, the plurality of cameras located at a plurality of camera positions is replaced by a single camera shooting images of the object according to a plurality of object positions. In such embodiments the object may be movingly, e.g., rotatably, positioned with respect to the single camera. Such embodiments may involve a switch-over time for the object to move from one object position to the next object position, which may increase the latency in acquiring images. This may have the advantage of cost reduction, using a single camera instead of several cameras.

The invention involves obtaining at least two images of the physical object. The number of images being at least two relates to the number of images required to create a convex voxel representation with a non-infinite size also being at least two. However, it may be clear that a larger number of images may result in higher accuracy for the voxel representation and/or improved ability to handle objects with non-convex and/or irregular shape. The number of images obtained may be two, three, more than three, four, or more than four. For instance, the number of images may be eight, as in the case of Example 2.

In embodiments, the 3D object may be a plant that is to be cut to create cuttings. This may be a process step in a process wherein, in a next step, the cuttings are picked and planted in a cultivation medium, as disclosed, e.g., in EP3247196A1. EP3247196A1 discloses the picking and planting of a 3D object being a cutting, disclosing the use of pattern recognitions algorithms to obtain the orientation and position of the cutting based on images from a camera system. However, EP3247196A1 does not disclose suitable pattern recognition algorithms for this purpose.

In embodiments, the robotic element may be used for applications of gripping objects, cutting objects, removing objects from belt conveyors or baskets, transportation of objects and assortment of objects. However, other tasks could be handled, as well. Examples of objects that are gripped by the robotic element include industrial products, packaged goods, food, plants suitable for producing cuttings from such as roses, and material such as metal or woods. However, organisms such as crops or fishery can be handled, as well. Thus, the objects that are handled are not limited to objects of a specific category.

Figure 8:
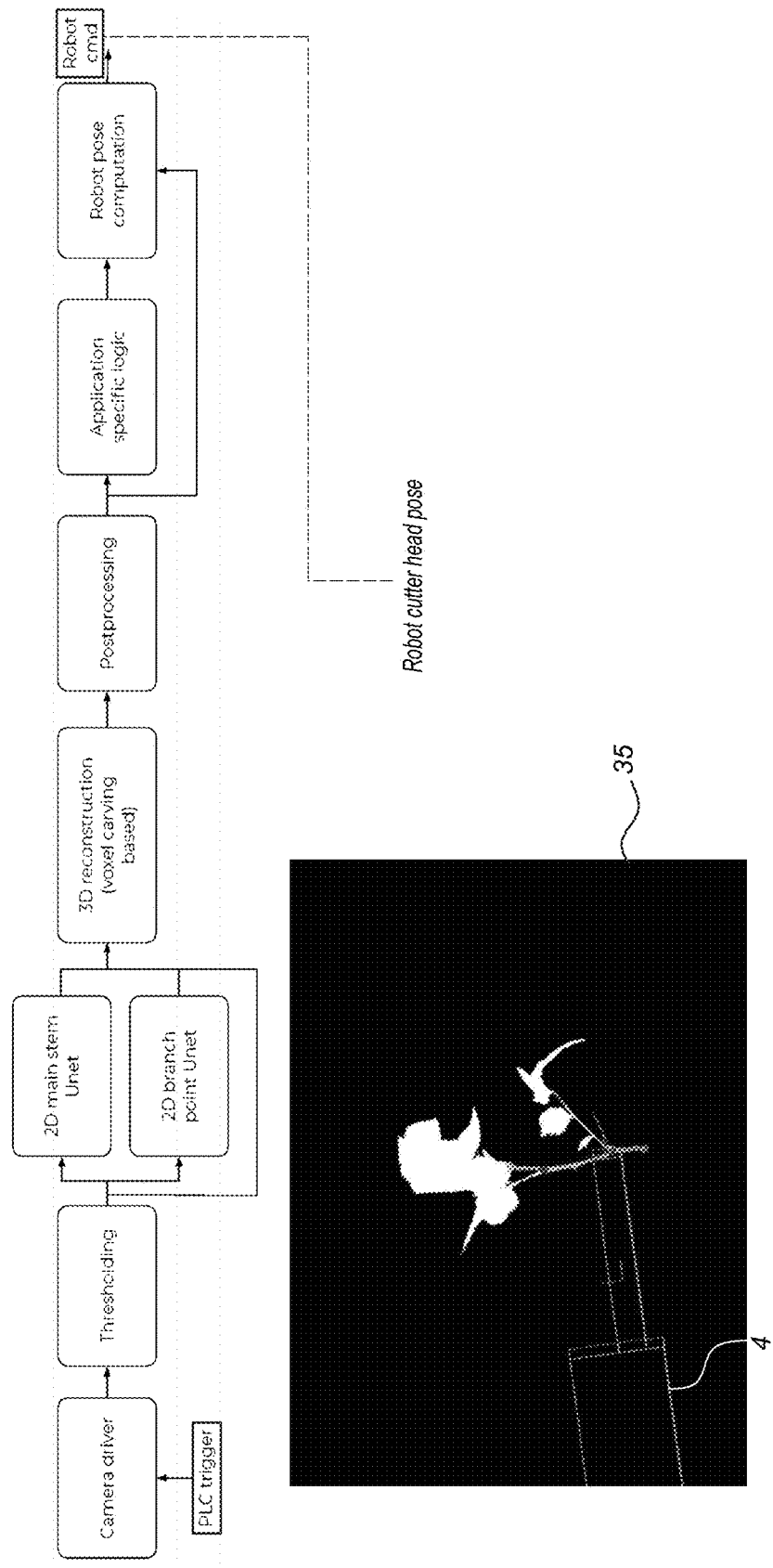
FIG. 8 illustrates a robot cutter head pose step of example embodiments of a method according to the invention.

In embodiments, the robot element may comprise a cutting tool, as is the case for the robot element 4 displayed in FIG. 8. The robot element may alternatively or additionally relate to a robotic hand that can grip objects. Robots with robotic elements of different shapes or different types can be used in embodiments according to the invention.

In a further aspect, which is not intended to limit the invention in any way, the invention provides a computer-implemented method for training a NN with respect to a 3D physical object (1) by means of a GUI (90, 110), the method comprising the steps of:
  obtaining a training set relating to a plurality of training objects (9), each of the training objects (9) comprising a 3D surface similar to the 3D surface of said object (1), the training set comprising at least two images for each training object (9);
  receiving, via said GUI (90, 110), manual annotations (91, 92, 93) with respect to a plurality of segment classes (91*a*, 92*a*, 93*a*) from a user of said GUI (90, 110) for each of the training objects;
  training, based on said manual annotations (91, 92, 93), at least one NN, for obtaining said at least one trained NN;
wherein the GUI comprises a 3D reconstruction view (111) and at least one image view (112) displayed along with said 3D reconstruction view, wherein the GUI is configured to let the receipt of a manual annotation (91, 92, 93) from the user via one, preferably each one, of said 3D reconstruction view (111) and one of said at least one image view (112) cause the other one, preferably each other one, of said 3D reconstruction view (111) and one of said at least one image view (112) to be updated according to said manual annotation (91, 92, 93), and wherein the NN comprises a semantic segmentation NN.

In embodiments, the GUI provides automated annotation of the at least two images acquired by the plurality of cameras, wherein the manual annotation of at least one first image belonging to said at least two images is used to automatically annotate at least one second image belonging to said at least two images and different from said at least one first image, based on automatically projecting the manual annotation of the at least one first image to the 3D voxel representation and back to the second image. This may relate to accurate camera calibration, since the accuracy of said automatic annotation of the at least two images is higher as more information regarding the position of the involved cameras is available.

According to a further aspect, which is not intended to limit the invention in any way, the present invention provides a method for generating a robot command (2) for handling a three-dimensional, 3D, physical object (1) present within a reference volume and comprising a 3D surface, comprising:
  obtaining (11) at least two images (30) of said physical object (1) from a plurality of cameras (3) positioned at different respective angles with respect to said object (1);
  generating (15), with respect to the 3D surface of said object (1), a voxel representation segmented based on said at least two images (30);
  computing (18) the robot command (2) for said handling of said object (1) based on said segmented voxel representation;
wherein the generating (15) comprises
  2D segmenting (14) said at least two images (30) by means of at least one trained 2D convolutional neural network, CNN, followed by performing (13) a 3D reconstruction of said 3D surface of said object (1) based at least on said at least two segmented images; and/or
  performing (13) a 3D reconstruction of said 3D surface of said object (1) based on said at least two images (30) for obtaining a voxel representation followed by 3D segmenting (14) said voxel representation by means of at least one trained 3D neural network, NN;
wherein said robot command (2) is computed (18) based on at least one of:
  a 3D coordinate within said reference volume; and/or
  a 3D orientation of said object (1) relative to said reference volume; and
wherein said robot command (2) is executable by means of a device comprising a robot element (4) configured for handling said object, and
wherein said at least one trained 2D CNN and/or said at least one trained 3D NN comprises a semantic segmentation NN.

A main advantage of such a method is the accurate and robust robot control provided by such a method.

In preferred embodiments, said at least one trained 2D CNN comprises a semantic segmentation NN being a 2D U-net. U-net is found to be particularly suitable due to increased speed and/or increased reliability, enabled by data augmentation and elastic deformation, as described in more detail in, e.g., (Ronneberger, Olaf; Fischer, Philipp; Brox, Thomas (2015). "U-net: Convolutional Networks for Biomedical Image Segmentation. arXiv:1505.04597").

In preferred embodiments, said at least one trained 3D NN comprises a semantic segmentation NN being a 3D PointNet++. PointNet++ is an advantageous choice in that it provides both robustness and increased efficiency, which is enabled by considering neighbourhoods at multiple scales. More detail is provided, e.g., in (Charles R. Qi et al., PointNet++: Deep Hierarchical Feature Learning on Point Sets in a Metric Space, 2017, https://arxiv.org/abs/1706.02413).

According to a further aspect, which is not intended to limit the invention in any way, the present invention provides a device for handling a three-dimensional, 3D, physical object (1) present within a reference volume and comprising a 3D surface, the device comprising a robot element, a processor and memory comprising instructions which, when executed by said processor, cause the device to execute a method according to the present invention.

According to a further aspect, which is not intended to limit the invention in any way, the invention provides a system for handling a three-dimensional, 3D, physical object (1) present within a reference volume and comprising a 3D surface, the system comprising:
- a device;
- a plurality of cameras (3) positioned at different respective angles with respect to said object (1) and connected to said device;
- a robot element (4) comprising actuation means and connected to said device;

wherein said device is configured for:
- obtaining (11), from said plurality of cameras (3), at least two images (30) of said physical object (1);
- generating (15), with respect to the 3D surface of said object (1), a voxel representation segmented based on said at least two images (30);
- computing (18) the robot command (2) for said handling of said object (1) based on said segmented voxel representation;
- sending said robot command (2) to said robot element (4) for letting said robot element (4) handle said object (1);

wherein said plurality of cameras (3) is configured for:
- acquiring at least two images (30) of said physical object (1);
- sending the images (30) to said device;

wherein said robot element (4) is configured for:
- receiving said robot command (2) from said device;
- handling said object (1) using said actuation means;

wherein the generating (15) comprises
- 2D segmenting (14) said at least two images (30) by means of at least one trained 2D convolutional neural network, CNN, followed by performing (13) a 3D reconstruction of said 3D surface of said object (1) based at least on said at least two segmented images; and/or
- performing (13) a 3D reconstruction of said 3D surface of said object (1) based on said at least two images (30) for obtaining a voxel representation followed by 3D segmenting (14) said voxel representation by means of at least one trained 3D NN;

wherein said robot command (2) is computed based on at least one of:
- a 3D coordinate within said reference volume; and/or
- a 3D orientation of said object (1) relative to said reference volume; and wherein said at least one trained 2D CNN and/or said at least one trained 3D NN comprises a semantic segmentation NN.

According to further aspects, which are not intended to limit the invention in any way, the invention relates to following clauses 1-15.

Clause 1. Method for generating a robot command (2) for handling a three-dimensional, 3D, physical object (1) present within a reference volume and comprising a 3D surface, comprising:
- obtaining (11) at least two images (30) of said physical object (1) from a plurality of cameras (3) positioned at different respective angles with respect to said object (1);
- generating (15), with respect to the 3D surface of said object (1), a voxel representation segmented based on said at least two images (30);
- computing (18) the robot command (2) for said handling of said object (1) based on said segmented voxel representation;

wherein the generating (15) comprises
- 2D segmenting (14) said at least two images (30) by means of at least one trained 2D convolutional neural network, CNN, followed by performing (13) a 3D reconstruction of said 3D surface of said object (1) based at least on said at least two segmented images; and/or
- performing (13) a 3D reconstruction of said 3D surface of said object (1) based on said at least two images (30) for obtaining a voxel representation followed by 3D segmenting (14) said voxel representation by means of at least one trained 3D neural network, NN;

wherein said robot command (2) is computed (18) based on at least one of:
- a 3D coordinate within said reference volume; and/or
- a 3D orientation of said object (1) relative to said reference volume; and
- wherein said robot command (2) is executable by means of a device comprising a robot element (4) configured for handling said object, and wherein said at least one trained 2D CNN comprises a semantic segmentation NN being a 2D U-net and/or wherein said at least one trained 3D NN comprises a semantic segmentation NN being a 3D PointNet++.

Clause 2. Method of clause 1, wherein at least one of said plurality of cameras (3) is a hyperspectral camera, wherein the object comprises a portion of a plant, and wherein said computing of said robot command is further based on values of pixels whereof at least the intensity is determined based on hyperspectral image information.

Clause 3. Method of clauses 1-2, wherein said robot command (2) is based at least on said 3D coordinate, and wherein said robot command (2) relates to a handling coordinate on said object (1) relating to said 3D coordinate.

Clause 4. Method of clause 3, wherein said robot command (2) is further based on said 3D orientation of said object (1), wherein said robot command (2) further comprises a 3D approaching angle for reaching the handling coordinate on said object (1), preferably wherein said object comprises one or more protrusions, wherein preferably said 3D approaching angle relates to reaching the handling coordinate in view of a position of said one or more protrusions for avoiding collision between said robot element and said one or more protrusions.

Clause 5. Method of clauses 1-4, wherein the generating (14) comprises said 2D segmenting (14) of said at least two images (30) by means of said at least one trained CNN followed by said performing (13) of said 3D reconstruction of said 3D surface of said object (1) based on said at least two segmented images; wherein said 2D segmenting comprises identifying pixels corresponding to said 3D surface of said object (1) and segmenting the pixels corresponding to said surface of said object (1) with said trained CNN for obtaining at least two segmented images; wherein said performing (13) of said 3D reconstruction of said 3D surface comprises obtaining a voxel representation and letting segmented pixels of the at least two segmented images correspond to segmented voxels in said voxel representation for obtaining said segmented voxel representation.

Clause 6. Method of clauses 1-5, wherein the generating (14) comprises said performing (13) of said 3D reconstruction of said 3D surface of said object (1) based on said at least two images (30) for obtaining said voxel representation followed by said 3D segmenting (14) of said voxel representation by means of said at least one trained 3D NN, wherein said 3D segmenting (14) comprises identifying voxels belonging to said 3D surface of said object (1) and segmenting the voxels belonging to said 3D surface with the trained 3D NN for obtaining said segmented voxel representation.

Clause 7. Method of clauses 1-6, wherein said method comprises the further step of post-processing (16) said segmented voxel representation in view of one or more semantic segmentation rules relating to one or more segment classes with respect to said 3D surface.

Clause 8. Method of clauses 1-7, wherein said semantic segmentation NN comprises any or any combination of: U-net, Dynamic Graph CNN, DGCNN, PointNet++.

Clause 9. Method of clauses 3-8, wherein said 3D surface of said object (2) is a plant comprising a stem corresponding to a first segment class and one or more leaves corresponding to a second segment class, wherein said actuation relates to cutting said stem at said handling coordinate, and wherein said 3D approaching angle for reaching the handling coordinate on said object relates to a 3D cutting angle for reaching the handling coordinate in view of a position of said leaves.

Clause 10. Method of clauses 1-9, comprising the further step of actuating said robot element (4) based on said robot command (2).

Clause 11. Method of clauses 1-10, comprising the further steps of
obtaining a training set relating to a plurality of training objects (9), each of the training objects comprising a 3D surface similar to the 3D surface of said object (1), the training set comprising at least two images for each training object;
receiving manual annotations (91, 92, 93) with respect to a plurality of segment classes (91a, 92a, 93a) from a user for each of the training objects via a GUI (90, 110);
training, based on said manual annotations (91, 92, 93), at least one NN, for obtaining said at least one trained NN.

Clause 12. Device for handling a three-dimensional, 3D, physical object (1) present within a reference volume and comprising a 3D surface, the device comprising a robot element, a processor and memory comprising instructions which, when executed by said processor, cause the device to execute a method according to clauses 1-11.

Clause 13. System for handling a three-dimensional, 3D, physical object (1) present within a reference volume and comprising a 3D surface, the system comprising:
a device, preferably the device according to clause 12;
a plurality of cameras (3) positioned at different respective angles with respect to said object (1) and connected to said device;
a robot element (4) comprising actuation means and connected to said device;
wherein said device is configured for:
obtaining (11), from said plurality of cameras (3), at least two images (30) of said physical object (1);
generating (15), with respect to the 3D surface of said object (1), a voxel representation segmented based on said at least two images (30);
computing (18) the robot command (2) for said handling of said object (1) based on said segmented voxel representation;
sending said robot command (2) to said robot element (4) for letting said robot element (4) handle said object (1);
wherein said plurality of cameras (3) is configured for:
acquiring at least two images (30) of said physical object (1);
sending the images (30) to said device;

wherein said robot element (4) is configured for:
receiving said robot command (2) from said device;
handling said object (1) using said actuation means;
wherein the generating (15) comprises
2D segmenting (14) said at least two images (30) by means of at least one trained 2D convolutional neural network, CNN, followed by performing (13) a 3D reconstruction of said 3D surface of said object (1) based at least on said at least two segmented images; and/or
performing (13) a 3D reconstruction of said 3D surface of said object (1) based on said at least two images (30) for obtaining a voxel representation followed by 3D segmenting (14) said voxel representation by means of at least one trained 3D neural network, NN;
wherein said robot command (2) is computed (18) based on at least one of:
a 3D coordinate within said reference volume; and/or
a 3D orientation of said object (1) relative to said reference volume; and
wherein said at least one trained 2D CNN comprises a semantic segmentation NN being a 2D U-net and/or wherein said at least one trained 3D NN comprises a semantic segmentation NN being a 3D PointNet++.

Clause 14. Computer-implemented method for training a NN with respect to a 3D physical object (1) by means of a GUI (90, 110), the method comprising the steps of:
obtaining a training set relating to a plurality of training objects (9), each of the training objects (9) comprising a 3D surface similar to the 3D surface of said object (1), the training set comprising at least two images for each training object (9);
receiving, via said GUI (90, 110), manual annotations (91, 92, 93) with respect to a plurality of segment classes (91a, 92a, 93a) from a user of said GUI (90, 110) for each of the training objects;
training, based on said manual annotations (91, 92, 93), at least one NN, for obtaining said at least one trained NN;
wherein the GUI comprises a 3D reconstruction view (111) and at least one image view (112) displayed along with said 3D reconstruction view, wherein the GUI is configured to let the receipt of a manual annotation (91, 92, 93) from the user via one of said 3D reconstruction view (111) and one of said at least one image view (112) cause the other one of said 3D reconstruction view (111) and one of said at least one image view (112) to be updated according to said manual annotation (91, 92, 93); and wherein the NN comprises a semantic segmentation NN.

Clause 15. A trained NN obtained by the computer-implemented method according to clause 14.

Below, the invention is illustrated according to a plurality of example embodiments, which are not intended to limit the scope of the invention in any way.

Example 1

Example Embodiments According to the Invention

FIG. 1 illustrates example embodiments of a method according to the invention. It relates to a method for generating a robot command (2) for handling a three-dimensional, 3D, physical object (1) present within a reference volume and comprising a 3D surface. It comprises the step of, based on a PLC trigger, obtaining (11) at least two images (30) of said physical object (1) from a plurality of cameras (3) positioned at different respective angles with respect to said object (1).

Each of the images is subject to a threshold (12), which may preferably be an application-specific pre-determined threshold, to convert them into black and white, which may be fed as a black and white foreground mask to the next step, either replacing the original images or in addition to the original images.

The next step comprises generating (15), with respect to the 3D surface of said object (1), a voxel representation segmented based on said at least two images (30).

The generating (15) comprises segmenting (14) said 3D surface by means of at least one trained neural network, NN, as well as performing (13) a 3D reconstruction of said 3D surface of said object (1).

In the next step, post-processing (16) is performed, which may relate for instance to continuity checks and/or segmentation checks, similar to the post-processing discussed for Example 2 and 4.

A next step relates to application specific logic (17), wherein details of the robot element actuation are determined. This may relate for instance to single actions (e.g. cutting only), or combined actions (e.g. cutting and planting), as discussed for Example 2 and 4.

In a final step, the robot command (2) for said handling of said object (1) is computed (18) based on said segmented voxel representation. Herein, said robot command (2) is based on at least one of: a 3D coordinate within said reference volume; and/or a 3D orientation of said object (1) relative to said reference volume;

Thereby, said handling of said object (1) by said robot command (2) relates to an actuation of a robot element (4) based on said 3D coordinate and/or said 3D orientation. Preferably, said NN comprises a U-net, PointNet++ and/or DGCNN.

Example 2

Example Embodiments with 2D CNN According to the Invention

FIG. 2-8 illustrate steps of example embodiments of a method according to the invention, wherein the NN is a CNN, particularly a 2D U-net.

FIG. 2 provides an overview of example embodiments of a method according to the invention. In this example, the object (1) is a rose present in the reference volume that is cut in cuttings such that the cuttings may be picked up and planted in a next process step. To this end, the robot element is a robot cutter head (4) that approaches the object and cuts the stem, according to the robot command, at appropriate positions such that cuttings with at least one leaf are created. Particularly, the robot command relates to a robot pose, that comprises a starting and/or ending position, i.e. a set of three coordinates, e.g., x, y, z, within the reference volume, and, if one of the starting and ending positions is not included, an approaching angle, i.e. a set of three angles, e.g., alpha, beta and gamma, indicating the angle from which the robot cutter head (4) should approach the object. The robot pose is thereby calculated such that leaves or side branches present on the main stem are not damaged due to the movement of the robot cutter head. Furthermore, it is desired that cutting is performed essentially perpendicularly to the stem direction.

The object (1) is held by a clamping means and is surrounded by at least two cameras, in this example eight cameras positioned at different respective angles with respect to said object. A uniform planar light source of high intensity is placed behind the object to ensure high contrast, which is beneficial for the further processing steps of the images.

FIG. 3 illustrates an image acquisition step of example embodiments of a method according to the invention. The image acquisition may be triggered by a PLC trigger. Of the eight acquired images 30, three are shown in FIG. 3. In this example, the images are processed in monochrome.

Figure 4:
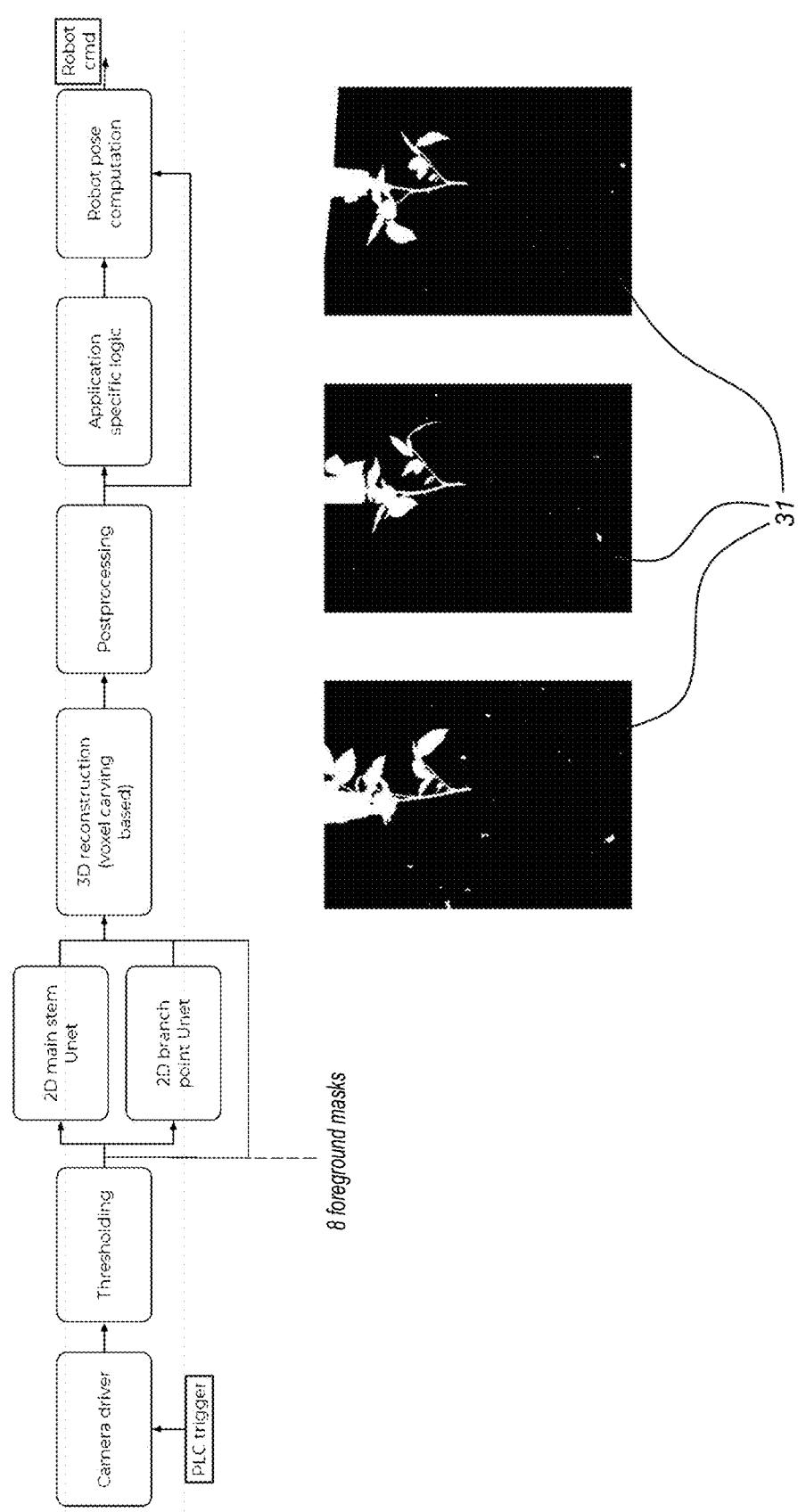
FIG. 4 illustrates a foreground mask step of example embodiments of a method according to the invention.

FIG. 4 illustrates a foreground mask step of example embodiments of a method according to the invention. In embodiments, each of the images is subject to a threshold (12) to convert them into black and white, and fed as a black and white foreground mask to the two trained CNNs (214) of this example, i.e. a 2D main stem U-net and a 2D branch point U-net. This has the effect to make the detection performed by the trained CNNs largely insensitive to light variation. In other embodiments, each of the images is furthermore subject to a greyscale processing to make the detection less sensitive to light variation while maintaining greyscale image information for allowing accurate positioning, and at least the greyscale images and optionally also the back and white foreground masks are fed to the two trained CNNs (214). In yet other embodiments, each of the images is subject to minimal or no processing, maintaining colour information present in the images, for allowing improved accuracy, and at least the colour images and optionally also the back and white foreground masks are fed to the two trained CNNs (214).

Figure 5:
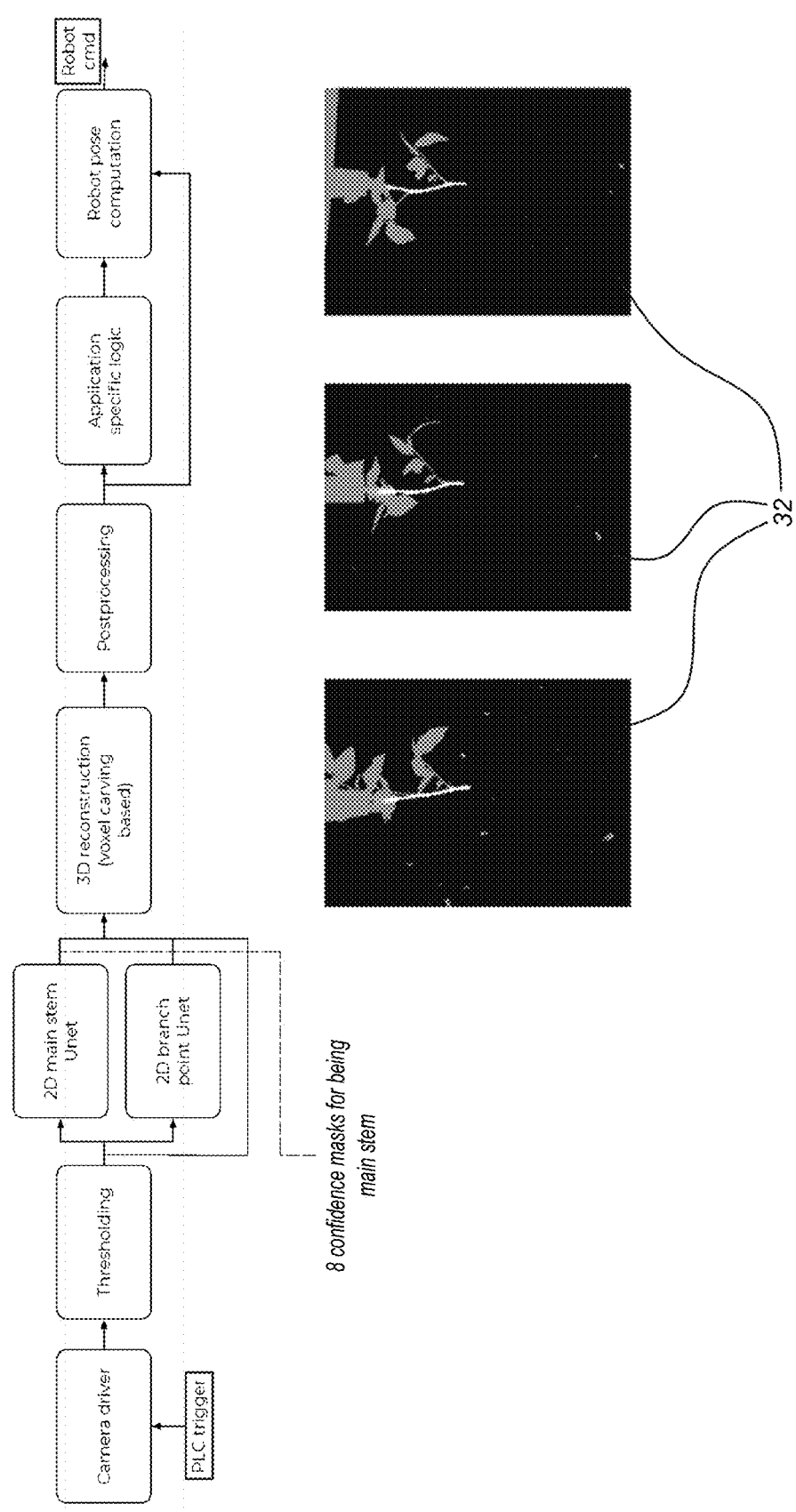
FIG. 5 illustrates a main stem confidence mask step of example embodiments of a method according to the invention.
Figure 6:
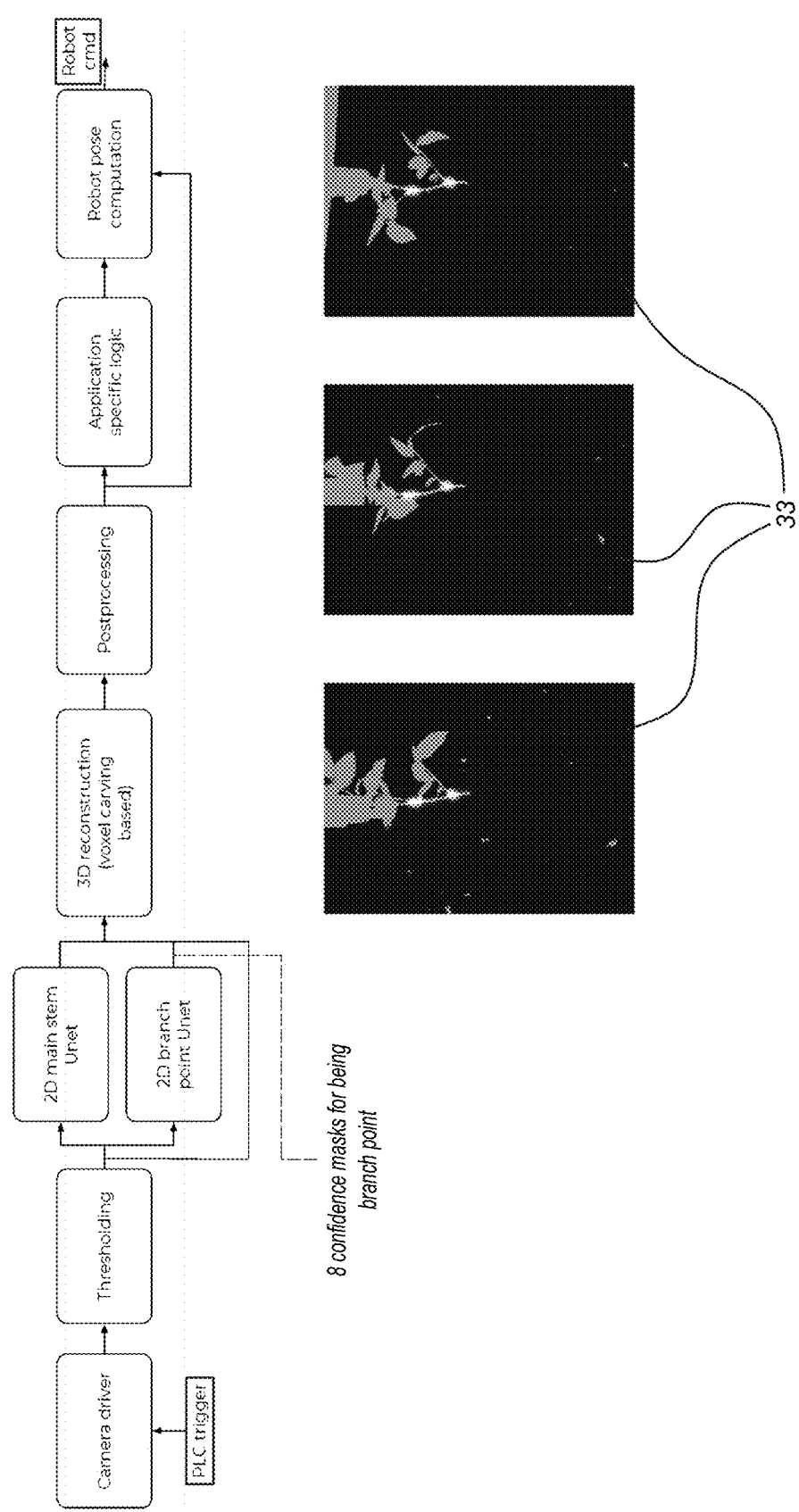
FIG. 6 illustrates a branch point confidence mask step of example embodiments of a method according to the invention.

FIG. 5 illustrates a main stem confidence mask step of example embodiments of a method according to the invention. FIG. 6 illustrates a branch point confidence mask step of example embodiments of a method according to the invention. In preferred embodiments, the resolution is kept low to keep processing speed high, working at resolutions such as (in pixels) 64×64, 128×128 or 256×256.

Each of the 2D U-net's processes the foreground mask to generate per-class probabilities for each pixel of each image, each class corresponding to one of a plurality of segment classes. In this example, the segment class is either main stem or branch point. The main stem U-net generates a first probability map, wherein each foreground pixel is assigned a probability value according to its probability of belonging to the main stem. Likewise, the branch point U-net generates a second probability map, wherein each foreground pixel assigned a probability value according to its probability of belonging to a branch point. This results in eight confidence masks (32) for the main stem segment class, each mask corresponding to an input image. Likewise, this results in eight confidence masks (33) for the branch point segment class, each mask corresponding to an input image.

Figure 7:
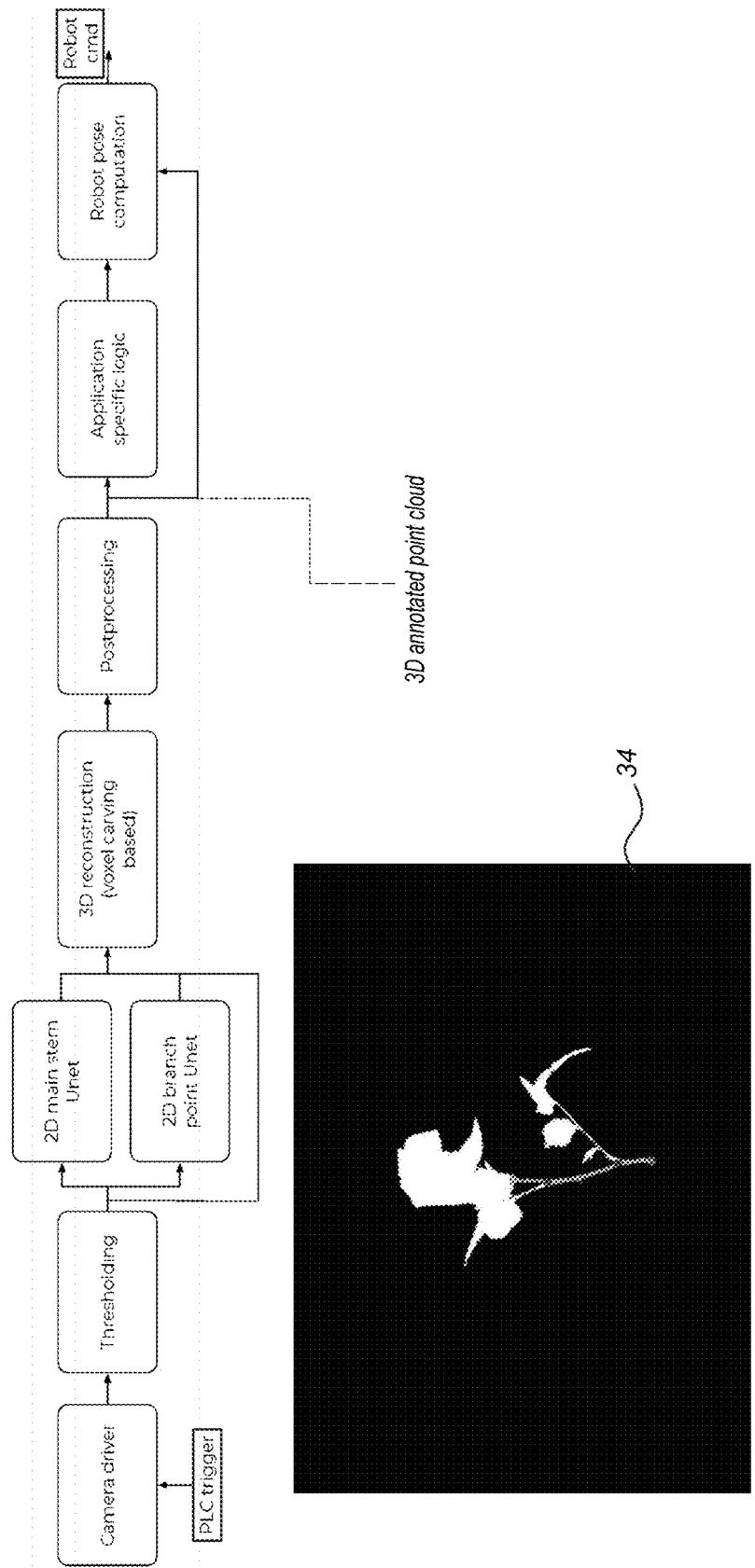
FIG. 7 illustrates a 3D annotated point cloud step of example embodiments of a method according to the invention.

FIG. 7 illustrates a 3D annotated point cloud step of example embodiments of a method according to the invention, for obtaining an annotated point cloud (34). The confidence masks (32, 33), sixteen in number in this example, are fed to a 3D reconstruction algorithm (213) together with the foreground masks (30). The 3D reconstruction is based on voxel carving for performing the 3D reconstruction, along with segmentation based on the confidence masks. This segmenting, which essentially boils down to "painting" portions of the 3D reconstructed surface according to the appropriate segment class, may for instance relate to transforming the plurality of confidence masks into segment masks by setting the segment class of each pixel according to averaging, but also other ways of assigning segment classes may be used, such as assigning to the class with the highest probability. Furthermore, in this example, also a further step of post-processing (216) is included. In the post-processing, features of the considered object may be taken into account to improve the segmentation. For instance, this may include a continuity check for the main stem, wherein gaps between adjacent portions of the main stem or determined to either belong to the main stem or not. This may furthermore relate to semantic checks, wherein the number of branch points and their mutual positions and/or their positions with respect to the main stem are determined and checked for validity and preferably corrected.

FIG. 8 illustrates a robot cutter head pose step of example embodiments of a method according to the invention. This relates to the robot pose, comprising a starting or ending position, i.e. a set of three coordinates, e.g., x, y, z, within the reference volume, and, with one of the starting and ending positions not included, an approaching angle, i.e. a set of three angles, e.g., alpha, beta and gamma, indicating the angle from which the robot cutter head (4) should approach the object. This may take into account an application specific logic step (17), wherein it is determined whether the action relates to cutting only, or includes further manipulations with respect to the cutting, such as cutting and planting. It may also relate to rules relating to the desired end product, i.e. a minimal or maximal length of the main stem of the cutting. After the robot command (2) is sent, a new object may be considered, and new images may be taken according to a new PLC trigger.

Example 3

Example GUI with 2D Annotation According to the Invention

Figure 9:
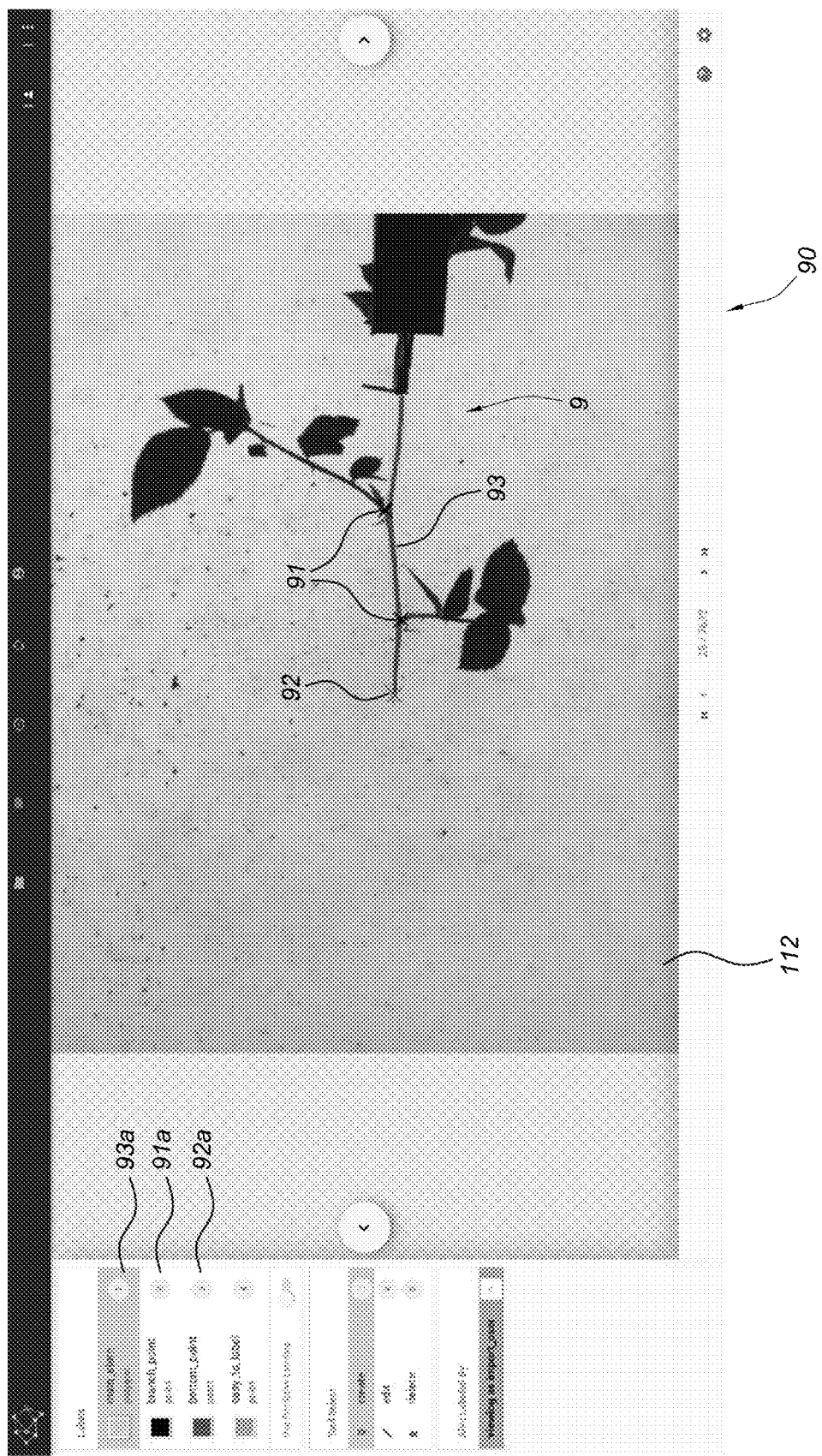
FIG. 9 illustrates example embodiments of a GUI with 2D annotation.

FIG. 9 illustrates example embodiments of a GUI with 2D annotation. The GUI (90) may be used for training of any NN, preferably a 2D U-net or a 3D PointNet++ or a 3D DGCNN, such as the CNNs of Example 2. The GUI operates on a training set relating to a plurality of training objects (9), in this example a training set with images of several hundred roses, with eight images for each rose taken by eight cameras from eight different angles. Each of the training objects (9) comprises a 3D surface similar to the 3D surface of the object for which the NN is trained, i.e. another rose.

However it should be noted that the NN, when trained for a rose, may also be used for plants with a structure similar to that of a rose, even if the training set did not comprise any training objects other than roses.

The GUI comprises at least one image view (112) and allows to receive manual annotations (91, 92, 93) with respect to a plurality of segment classes (91a, 92a, 93a) from a user of said GUI (90, 110) for each of the training objects. Particularly, the segment classes relate to branch main stem (93a), branch points (91a), and bottom points (92a), each depicted in such a way that they are visually distinguishable, e.g., by means of different colors and shapes. In this example, for instance, different colors are used, and the main stem is marked by a polygon (93) on the image view (112), whereas the branch points (91) and bottom points (921) are crosses with different respective colors.

The GUI allows to receive manual annotations of the entire test set. In a next step, the manual annotations (91, 92, 93) are used to train at least one NN. In the case of the CNNs of Example 2, this corresponds to the trained main branch U-net and the trained main stem U-net.

Example 4

Example Embodiment with 3D NN According to the Invention

Figure 10:
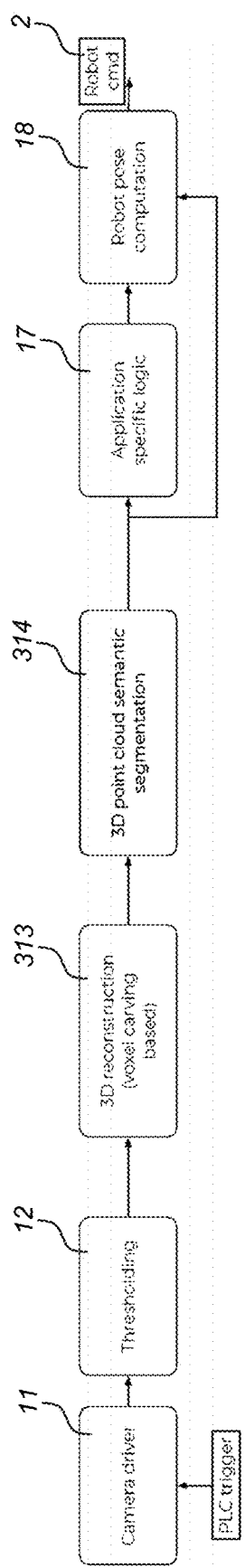
FIG. 10 illustrates example embodiments of a method according to the invention with 3D NN.

FIG. 10 illustrates example embodiments of a method according to the invention with 3D NN. The method is essentially the same as that of Example 2 with respect to the image acquisition (11), thresholding (12), application specific logic (17) and the robot pose computation (18). However, instead of using 2D U-nets, the output of the thresholding step is fed directly to the 3D reconstruction step (313), which generates an unsegmented 3D voxel representation. This voxel representation is then fed into a 3D point cloud semantic segmentation step (314), which relates to one or more 3D trained NNs, for instance a 3D main stem NN and a 3D branch point NN, wherein the NNs preferably comprise PointNet++ or DGCNN. While FIG. 10 does not display post-processing, the step of 3D point cloud semantic segmentation (314) may include post-processing along the lines of Example 2, including e.g. a continuity check for the main stem and/or semantic checks, wherein the number of branch points and their mutual positions and/or their positions with respect to the main stem are determined and checked for validity and preferably corrected. The result thereof may again be fed to the further steps, similar to Example 2.

Example 5

Example Embodiment with 2D and 3D NN According to the Invention

This example method is essentially a combination of Example 2 and Example 4, wherein the input of the 3D reconstruction step not only includes images after thresholding, but also confidence masks output by one or more U-nets. The voxel representation generated accordingly may already comprise a preliminary segmentation, which may be further improved by applying one or more 3D trained NNs, for instance a 3D main stem PointNet++ or DGCNN and a 3D branch point PointNet++ or DGCNN. The combined use of 2D NNs and 3D NNs for semantic segmentation may lead to enhanced accuracy and/or robustness.

Example 6

Example GUI with 2D and 3D Annotation According to the Invention

Figure 11:
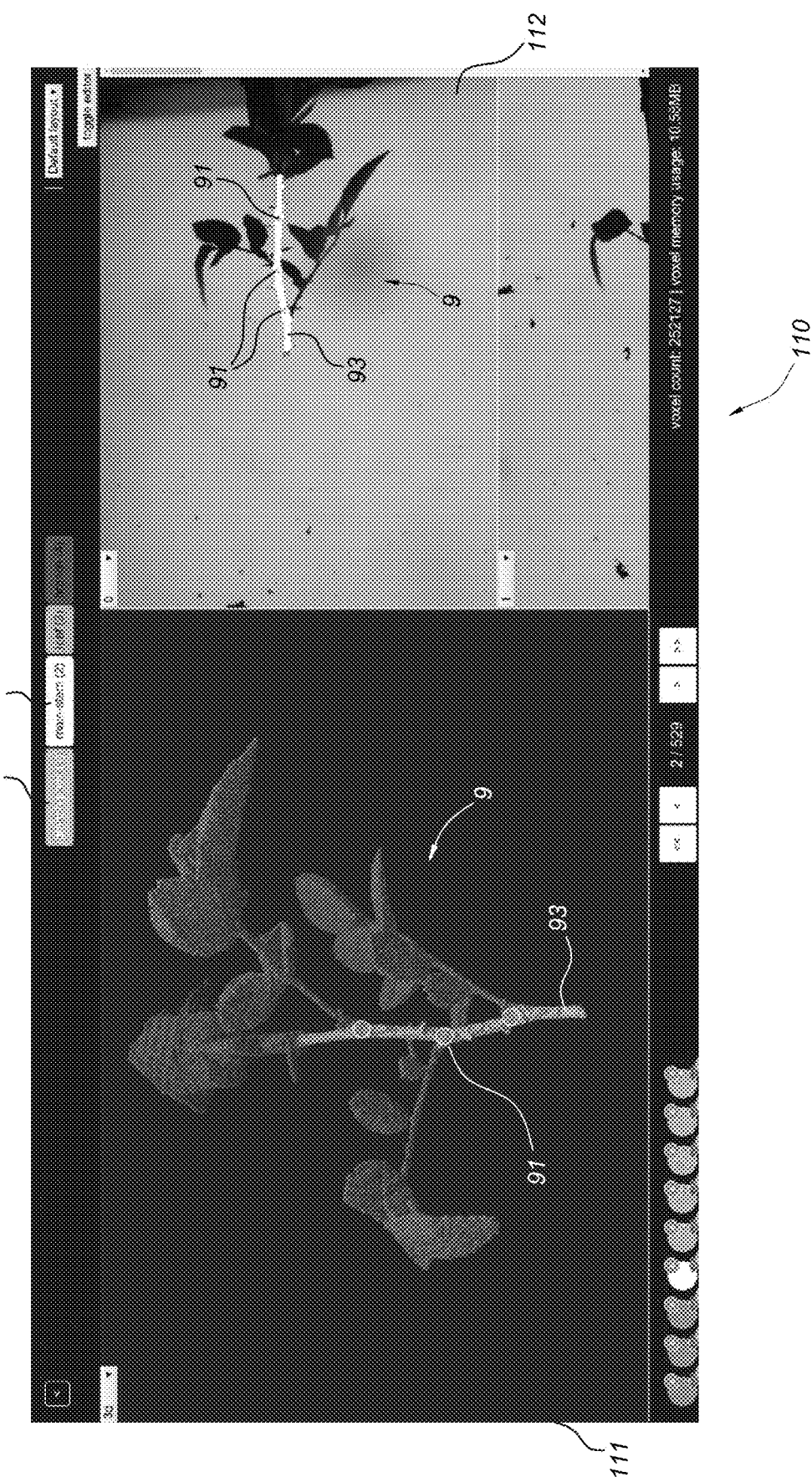
FIG. 11 illustrates example embodiments of a GUI with both 2D and 3D annotation.

FIG. 11 illustrates example embodiments of a GUI (110) with both 2D and 3D annotation. The GUI is similar to that of Example 3 in operation and aim, with the further addition of a 3D reconstruction view (111). The 3D reconstruction view (111) comprises a 3D voxel representation generated from the image data and is displayed along with at least one image view (112). The GUI lets the receipt of a manual annotation (91, 92, 93) from the user via one of said 3D reconstruction view (111) and one of said at least one image view (112) cause the other one of said 3D reconstruction view (111) and one of said at least one image view (112) to be updated according to said manual annotation (91, 92, 93). This relates to by automatically projecting the manual annotation of an image to a 3D voxel representation, or vice versa. This is advantageous since it leads to more user-friendly and/or more accurate and/or faster manual annotation by the user.

The GUI 110 may be used for training of any NN, preferably a 3D PointNet++ or DGCNN, such as the NNs of examples 4 or 5. The GUI may operate on a training set relating to a plurality of training objects (9), in this example a training set with images of several hundred roses, e.g. 529 roses, with eight images for each rose taken by eight cameras from eight different angles.

Preferably, the GUI thereby provides automated annotation of the at least two images acquired by the plurality of cameras, wherein the manual annotation of at least one first image belonging to said at least two images is used to automatically annotate at least one second image belonging to said at least two images and different from said at least one first image. Herein, the at least one second image may comprise images which have not been annotated yet, but also images which have been annotated previously. This is enabled by automatically projecting the manual annotation of the at least one first image to the 3D voxel representation and back to the second image. This has the advantage of reducing the manual work involved in annotating the 2D images, both in case of 2D segmentation and 3D segmentation. In preferred embodiments, this relates to accurate camera calibration, since the accuracy of said automatic annotation of the at least two images is higher as more information regarding the position of the involved cameras is available.

Example 7

Example of Automated Annotation Involving 3D Reconstruction

This example relates to a GUI that is similar to that of Example 3 in operation and aim, with the GUI comprising at least one image view (112) and allowing to receive manual annotations (91, 92, 93) of at least one first 2D image with respect to a plurality of segment classes (91a, 92a, 93a) from a user of said GUI (90, 110) for each of the training objects.

The GUI provides automated annotation of the at least two images acquired by the plurality of cameras, wherein the manual annotation of at least one first image belonging to said at least two images is used to automatically annotate at least one second image belonging to said at least two images and different from said at least one first image, based on automatically projecting the manual annotation of the at least one first image to the 3D voxel representation and back to the second image, similar as in Example 6. As in Example 6, in preferred embodiments, this relates to accurate camera calibration, since the accuracy of said automatic annotation of the at least two images is higher as more information regarding the position of the involved cameras is available. Different from Example 6, in this Example, no 3D reconstruction view is updated.

The invention claimed is:

1. A computer-implemented method for labelling a training set, for training a NN, with respect to a 3D physical object by a Graphical User Interface, GUI, the method comprising the steps of:
obtaining the training set relating to a plurality of training objects, each of the training objects comprising a 3D surface similar to the 3D surface of said object, the training set comprising at least two images for each training object;
generating, for each training object, a respective 3D voxel representation based on the respective at least two images;
receiving, via said GUI, manual annotations with respect to a plurality of segment classes from a user of said GUI for labelling each of the training objects; and
training, based on said manual annotations, at least one NN, for obtaining said at least one trained NN;
wherein the GUI comprises
a 3D reconstruction view showing said 3D voxel representation for a respective one of the plurality of training objects; and
at least one image view showing at least one of the respective at least two images associated with the respective training object; said at least one image view being displayed along with said 3D reconstruction view;
and wherein the method comprises the further step of:
for at least one training object, and based on the manual annotation of at least one of
a first image belonging to said at least two images, via said at least one image view, and
said 3D voxel representation, via said 3D reconstruction view, and automatically annotate the other one of said first image and said 3D voxel representation, based on automatically projecting the manual annotation of the at least one of the first image and the 3D voxel representation to the other one of said first image and said 3D voxel representation.

2. The computer-implemented method of claim 1, wherein the GUI is configured to let the receipt of the manual annotation from the user via at least one of said 3D reconstruction view and said at least one image view cause the other one of said 3D reconstruction view and one of said at least one image view to be updated according to said automatic annotation.

3. The computer implemented method of 1, wherein said automatic annotation is performed based on manual annotation of either of said first image or said 3D voxel representation to automatically annotate the other one of said first image and said 3D reconstruction view.

4. The computer implemented method of claim 3, wherein the GUI is configured to let said receipt of the manual annotation from the user via either one of said 3D reconstruction view and one of said at least one image view cause the other one of said 3D reconstruction view and one of said at least one image view to be updated according to said automatic annotation.

5. The computer implemented method of claim 4, further comprising the step of:
for at least one training object, and based on the manual annotation of at least said first image belonging to said at least two images, automatically annotate at least one second image belonging to said at least two images and different from said at least one first image, based on automatically projecting the manual annotation of the at least one first image to the 3D voxel representation and back to the second image.

6. The computer implemented method of claim 1, wherein the GUI is configured to let the receipt of the manual annotation cause each of the at least one image view and the 3D reconstruction view to be updated according to said automatic annotation.

7. The computer implemented method of claim 1, wherein the GUI comprises at least two image views each showing one of the respective at least two images, and wherein each of said at least two image views is displayed along with said 3D reconstruction view.

8. The computer implemented method of claim 1, wherein for each training object, the respective at least two images originate from a plurality of respective predetermined camera angles and respective predetermined camera positions with respect to said training object, said predetermined camera angles and predetermined camera positions being the same for each training object.

9. The computer implemented method of claim 8, wherein said predetermined camera positions and predetermined camera angles relate to respective ones of a plurality of cameras with fixed relative positions.

10. The computer implemented method of claim 1, wherein said plurality of respective segment classes are associated with a respective highlighting type, each highlighting type relating at least to a distinct color, and wherein the GUI is configured to let the receipt of the manual annotation relating to a first segment class via at least one of said 3D reconstruction view and said at least one image view cause the each of said 3D reconstruction view and one of said at least one image view to be updated in accordance with the highlighting type associated with said first segment class.

11. The computer implemented method of claim 1, wherein said training of the NN is directed at least at discriminating between each of said plurality of segment classes, and wherein the NN comprises a semantic segmentation NN.

12. The computer implemented method of claim 11, wherein said semantic segmentation NN comprises any or any combination of: 2D U-net, 3D U-net, Dynamic Graph CNN, DGCNN, PointNet++.

13. The computer implemented method of claim 1, wherein the training of the NN is directed at least at discriminating between each of two or more instances of said 3D physical object or two or more instances of a portion of said 3D physical object, and wherein the NN comprises an instance segmentation NN.

14. The computer implemented method of claim 13, wherein said instance segmentation NN comprises any or any combination of: Mask R-CNN, DeepMask, TensorMask, 3D-BoNet, ASIS.

15. A labelled training set or a trained NN obtained by the computer-implemented method according to claim 1.

* * * * *